US011366934B2

(12) United States Patent
Chen et al.

(10) Patent No.: US 11,366,934 B2
(45) Date of Patent: Jun. 21, 2022

(54) SYSTEM AND METHOD FOR ANTI-ROLLBACK

(71) Applicant: Samsung Electronics Co., Ltd., Suwon-si (KR)

(72) Inventors: Geng Chen, San Jose, CA (US); Jia Ma, San Jose, CA (US); Bulent Kasman, Antioch, CA (US); Na Yu, San Jose, CA (US); Xudong Jin, Fremont, CA (US); Jian Wang, Santa Clara, CA (US); Hyungseok Yu, Suwon-Si (KR); Seunghoon Lee, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 16/521,388

(22) Filed: Jul. 24, 2019

(65) Prior Publication Data

US 2020/0151366 A1    May 14, 2020

Related U.S. Application Data

(60) Provisional application No. 62/760,837, filed on Nov. 13, 2018.

(51) Int. Cl.
*G06F 21/72* (2013.01)
*G06F 1/14* (2006.01)
(Continued)

(52) U.S. Cl.
CPC .............. *G06F 21/725* (2013.01); *G06F 1/14* (2013.01); *G06F 21/575* (2013.01); *G06F 21/64* (2013.01); *G06F 21/78* (2013.01)

(58) Field of Classification Search
CPC .......... G06F 1/14; G06F 21/554; G06F 21/57; G06F 21/575; G06F 21/64–645; G06F 21/725; G06F 21/78–805
See application file for complete search history.

(56) References Cited

U.S. PATENT DOCUMENTS 5,999,921 A    12/1999   Arsenault et al.
7,116,969 B2   10/2006   Park
(Continued)

OTHER PUBLICATIONS

Notification of Transmittal of the International Search Report and the Written Opinion of the International Searching Authority, or the Declaration dated Feb. 18, 2020 in connection with International Patent Application No. PCT/KR2019/014926, 10 pages.

*Primary Examiner* — Kevin Bechtel

(57) ABSTRACT

A method for providing an anti-rollback secure timer service includes determining, at a device which includes a processor providing a trusted execution environment (TEE), a trusted memory, and a real time clock (RTC) accessible through an operating system of the device, an initial reference time value, by a secure timer application running in the TEE, the initial reference time value determined based on an initial value of the RTC obtained during booting of the device and a time delta value. The method further includes determining an updated reference time value based on the initial reference time value, a second value of the RTC, and a previously stored old reference time value, determining an updated time delta value based on the second value of the RTC and the updated reference time value, and storing the updated time delta value and the updated reference time value in the trusted memory.

17 Claims, 12 Drawing Sheets

(51) Int. Cl.
*G06F 21/78* (2013.01)
*G06F 21/64* (2013.01)
*G06F 21/57* (2013.01)

(56) References Cited

U.S. PATENT DOCUMENTS

| | | |
|---|---|---|
| 7,765,423 B2 | 7/2010 | Madar et al. |
| 9,417,654 B2 | 8/2016 | Kulkarni et al. |
| 2014/0095918 A1* | 4/2014 | Stahl .................... G06F 21/725 713/500 |
| 2014/0250290 A1 | 9/2014 | Stahl et al. |
| 2015/0186676 A1 | 7/2015 | Arora et al. |
| 2015/0378389 A1 | 12/2015 | Kulkarni et al. |
| 2017/0185789 A1* | 6/2017 | Khosravi ............ G06F 21/6209 |
| 2018/0088625 A1 | 3/2018 | Krithivas et al. |

* cited by examiner

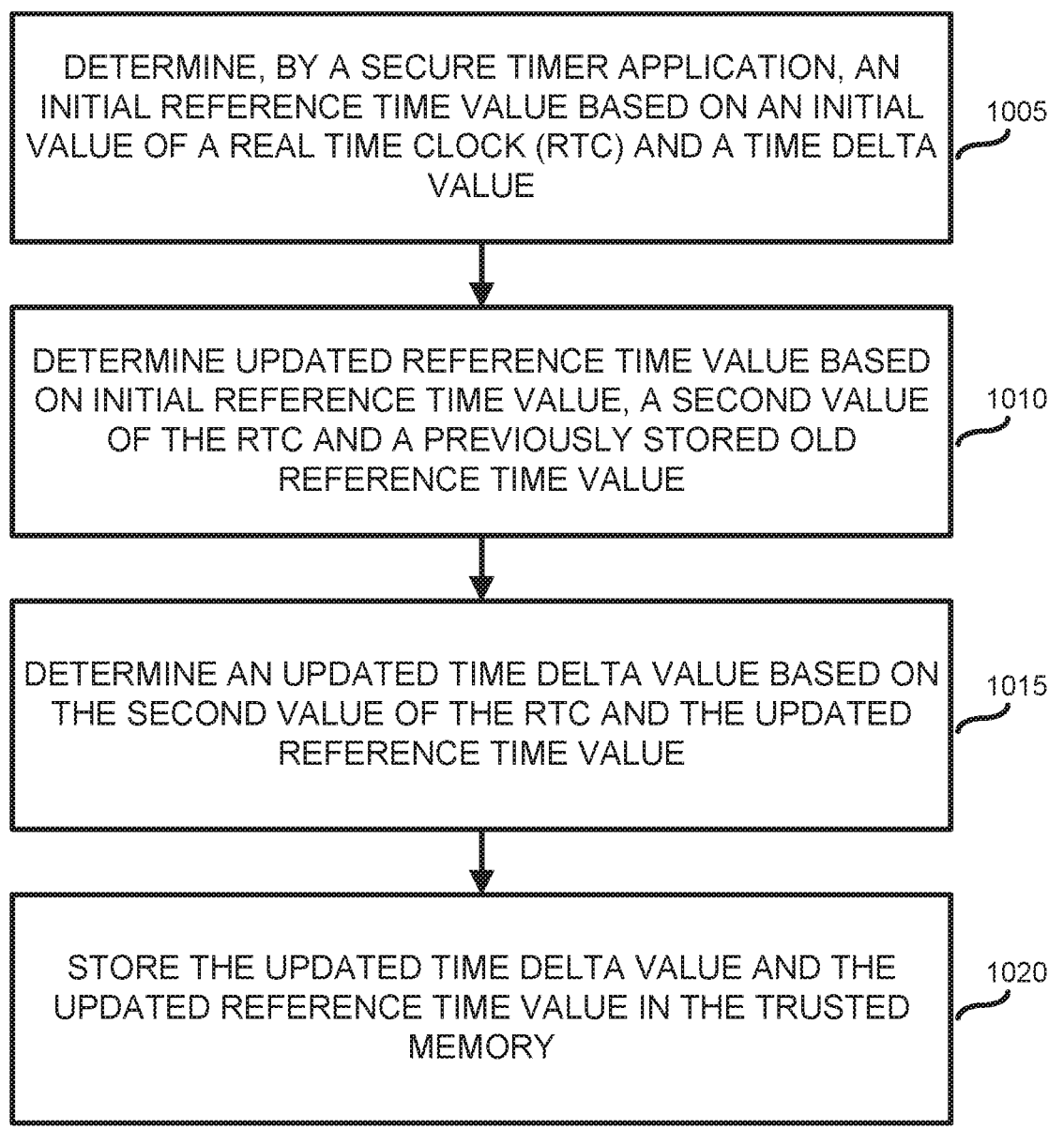

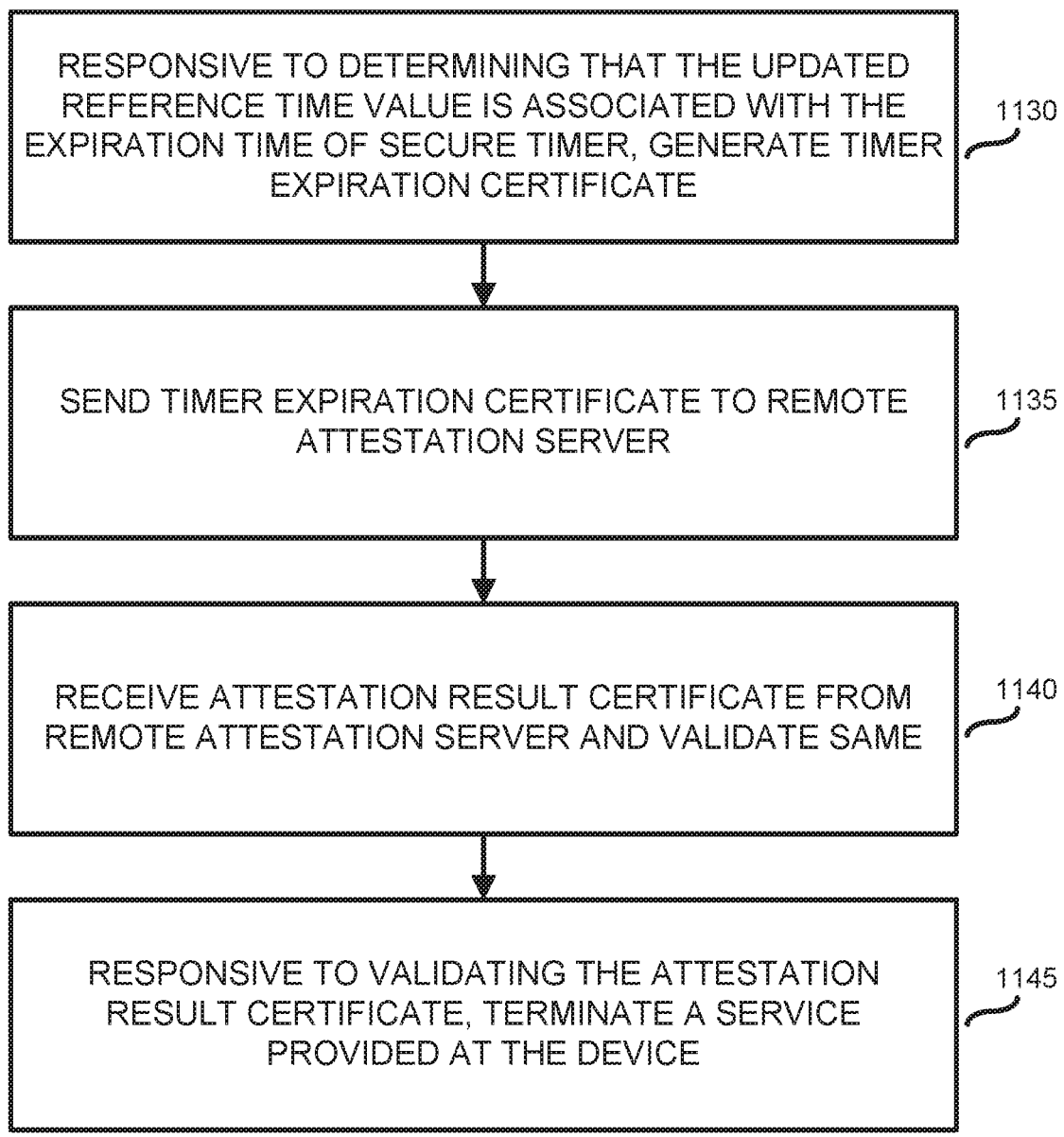

SYSTEM AND METHOD FOR ANTI-ROLLBACK

CROSS-REFERENCE TO RELATED APPLICATION AND CLAIM OF PRIORITY

This application claims priority under 35 U.S.C. § 119(e) to U.S. Provisional Patent Application No. 62/760,837 filed on Nov. 13, 2018. The above-identified provisional patent application is hereby incorporated by reference in its entirety.

TECHNICAL FIELD

This disclosure relates generally to device security. More specifically, this disclosure relates to systems and method for anti-rollback.

BACKGROUND

Certain networked computing devices, such as smartphones, tablets and wearables (for example, smart watches) have proven to be effective platforms for the provision of time-based application services (such as wireless communication service contracts, or short term "rentals" in which items of digital content are accessible for a specified period of time). In many cases, the time-based application services employ a decentralized timekeeping architecture, in which the determination of gating times (e.g., the expiration of a rental) is keyed off of a real time clock (RTC) on the device. Often, a device's RTC is accessible to many other applications on the device (including malware and viruses) through the device's operating system framework. As such, malicious actors can "roll back" the values output by RTC to postpone or avoid reaching a gating time.

Thus, improving the reliability and trustworthiness of device RTC values as timekeepers for time-based application services remains a source of technical challenges and opportunities for improvement in the operation of certain networked computing devices.

SUMMARY

This disclosure provides a system and method for anti-rollback.

In a first embodiment, a method for providing an anti-rollback secure timer service is provided. The method includes determining, at a device that includes a processor providing a trusted execution environment (TEE), a trusted memory, and a real time clock (RTC) accessible through an operating system of the device, an initial reference time value, by a secure timer application running in the TEE, the initial reference time value determined based on an initial value of the RTC obtained during booting of the device and a time delta value. The method further includes determining an updated reference time value based on the initial reference time value, a second value of the RTC, and a previously stored old reference time value. The method further includes determining an updated time delta value based on the second value of the RTC and the updated reference time value, and storing the updated time delta value and the updated reference time value in the trusted memory.

In a second embodiment, an apparatus is provided. The apparatus includes a processor providing a trusted execution environment (TEE), a real-time clock (RTC) accessible through an operating system of the apparatus and a memory. Further, processor is configured to determine, by a secure timer application running in the TEE, an initial reference time value, the initial reference time value determined based on an initial value of the RTC obtained during booting of the device and a time delta value. The processor also is configured to determine an updated reference time value based on the initial reference time value and a second value of the RTC, and a previously stored old reference time value. The processor is further configured to determine an updated time delta value based on the second value of the RTC and the updated reference time value, and store the updated time delta value and the updated reference time value in the trusted memory.

In a third embodiment, a non-transitory computer-readable medium includes program code, which when executed by a device, causes the device to determine, at the device, the device including a processor providing a trusted execution environment (TEE), a trusted memory, and a real time clock (RTC) accessible through an operating system of the device, an initial reference time value, by a secure timer application running in the TEE, the initial reference time value determined based on an initial value of the RTC obtained during booting of the device, and a time delta value. The program code, when executed by the processor, further causes the device to determine an updated reference time value based on the initial reference time value, a second value of the RTC, and a previously stored old reference time value, determine an updated time delta value based on the second value of the RTC and the updated reference time value, and store the updated time delta value and the updated reference time value in the trusted memory.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 10 illustrates an example of operations of a method for providing anti-rollback according to various embodiments of this disclosure; and FIGS. 11A and 11B illustrate operations of methods for providing anti-rollback and related functionalities according to some embodiments of this disclosure.

DETAILED DESCRIPTION

FIGS. 1 through 11B, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged electronic device.

Figure 1:
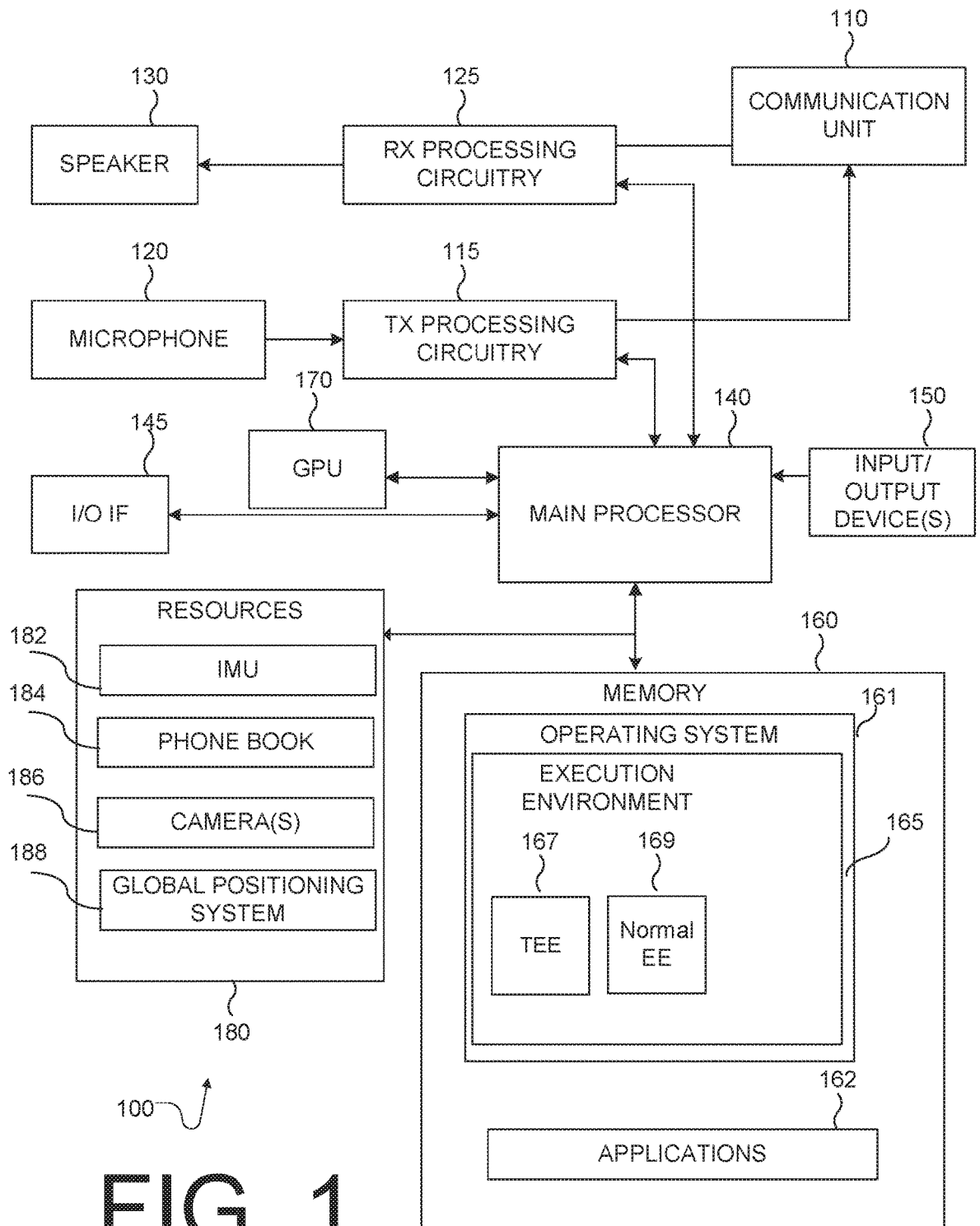
FIG. 1 illustrates an example of a device for implementing anti-rollback according to various embodiments of this disclosure.

FIG. 1 illustrates an example of an electronic device for implementing anti-rollback according to certain embodiments of this disclosure. The embodiment of the electronic device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, device 100 includes a communication unit 110 that may include, for example, a radio frequency (RF) transceiver, a BLUETOOTH transceiver, or a Wi-Fi transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 comprise one or more applications in which an external entity relies, at least in part, on device 100 to act as a timekeeper for one or more time-dependent functionalities of the application. Applications 162 can include media applications, which provide time limited access to items of digital content (for example, renting video content, such as a movie), virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to certain embodiments, applications 162 may include an application with allowing other components of the device (for example, communication unit 110) to access external resources, such as a wireless network. Further, applications 162 may include applications containing program code that when executed by a processor, such as main processor 140, cause the processor to perform steps of methods for monitoring suspicious application access according to certain embodiments of the present disclosure.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal.

The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

Additionally, operating system 161 is capable of providing an execution environment 165 for applications. According to some embodiments, execution environment 165 includes a trusted execution environment ("TEE") 167 (for example TRUSTZONE by ARM) and a normal execution environment 169. According to certain embodiments, certain memory and processor resources accessible in TEE 167 are not accessible to applications running in "normal world" 169. In some embodiments, TEE 167 provides a trusted user interface through which content associated with sensitive device functionalities (for example, payments to be made using a mobile wallet application) can be rendered and displayed for a user.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). In various embodiments according to this disclosure, memory 160 includes one or more trusted memory locations, including, without limitation, a replay protected memory block ("RPMB") or an embedded secure element ("eSE"). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, resources 180 include an accelerometer or inertial motion unit 182, which can detect movements of the electronic device along one or more degrees of freedom. Additional resources 180 include, in some embodiments, a user's phone book 184, one or more cameras 186 of electronic device 100, and a global positioning system 188.

Although FIG. 1 illustrates one example of a device 100 for implementing anti-rollback, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
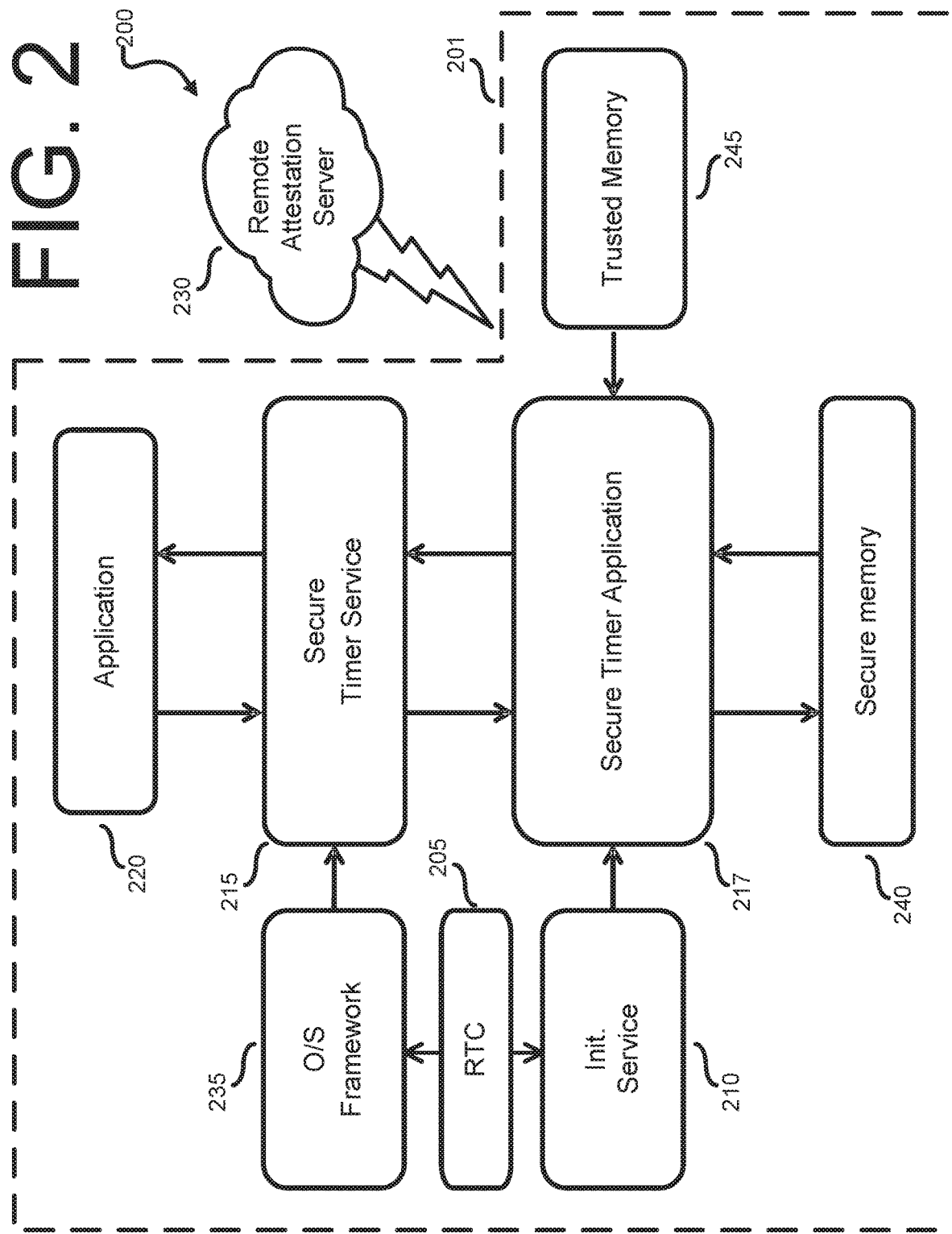
FIG. 2 illustrates an example of a system architecture for implementing anti-rollback in conjunction with an RTC alarm service according to some embodiments of this disclosure.

FIG. 2 illustrates an example of a system architecture 200 for implementing anti-rollback and a real time clock ("RTC") alarm service according to various embodiments of this disclosure. The embodiment of the system architecture 200 shown in FIG. 2 is for illustration only and other embodiments could be used without departing from the scope of the present disclosure.

Referring to the non-limiting example of FIG. 2, system architecture 200 comprises two platforms a device 201 (for example, device 100 in FIG. 1), and a remote attestation server 230. According to certain embodiments, device 100 comprises any networked device with a processor, which is able to implement a device real time clock (RTC) 205, and one or more applications 220. In this non-limiting example, application 220 comprises an application with one or more application functionalities (for example, access to digital content) whose provision is dependent on a time value provided by device RTC 205. In some embodiments, application 220 also provides triggers and alarm configuration information (for example, trigger 947 and alarm 970 in FIG. 9), to configure a time-dependent functionality (for example, a period in which a subscription service is provided) by application 220.

Referring to the non-limiting example of FIG. 2, device real time clock (RTC) 205 is a clock, implemented as hardware, software, or a combination thereof, which provides an internal timekeeping functionality for scheduling processes on device 201. According to some embodiments, device RTC 205 keeps a standard time value (sometimes expressed in "ticks" of the RTC), which is accessible, through OS framework 235, by application 220 (and other applications or processes running on device 201. Being accessible to a wide number of applications through O/S framework 235, device RTC 205 is, in various embodiments according to this disclosure, susceptible to manipulation, such as by rollback or initialization.

As shown in the non-limiting example of FIG. 2, device 201 also includes operating system ("O/S") framework 235, which, in certain embodiments, comprises a set of application programming interfaces ("APIs") and a software development kit ("SDK") for implementing a time-dependent service in application 220.

In certain embodiments, device 201 further includes secure timer service 215, which comprises a service for providing an intermediary between and the 0/S framework 235, application 220 and secure timer application 217, which, in certain embodiments, runs in a trusted execution environment (TEE) of device 201. According to certain embodiments, secure timer service 215 also interfaces with remote attestation server 230, by, for example, sending and receiving attestation certificates regarding the expiration of alarms associated with application 220. In some embodiments, secure timer service 215 obtains current values of the RTC time from device RTC and passes the values to secure timer application 217. In some embodiments, secure timer service 215 passes information and instructions (for example, an instruction to cancel a service) based on the state of alarm(s) associated with application 220.

Referring to the non-limiting example of FIG. 2, secure timer application 217 is a trusted application that generates and updates a reference timestamp stored in trusted memory 245 which is protected against rollback. According to certain embodiments, secure timer application 217 runs in a TEE (for example, TEE 167 in FIG. 1) on device 201. According to various embodiments secure timer application 217 implements a tick counter that is configured to obtain a trusted measurement (expressed in ticks of equal length to the ticks of device RTC 205) of intervals between triggering events (for example, powering a device on an obtaining an initial RTC time).

As shown in the illustrative example of FIG. 2, device 201 further comprises an initial service 210, which, responsive to device 201 being powered on, and at a time before device 201 is fully booted and O/S framework 235 is fully running, writes the current value of device RTC 205 to secure memory 240. Thus, in certain embodiments according to this disclosure, an initial value of device RTC 205 is obtained by initial service 210 at a time when it is not possible for a malicious actor to access device RTC 205 to roll it back or otherwise manipulate the device clock. In some embodiments according to this disclosure, initial service 210 provides the initial value of device RTC 205 to secure memory 240, which, in some embodiments comprises a memory of device 201 which is generally, or completely, inaccessible to applications other than secure timer application 217. As one, non-limiting example, secure memory 240 comprises a block of random access memory (RAM) that is shared by a modem processor (which, in certain embodiments, is a component of communication unit 110 of FIG. 1) and an application processor (for example, a processor associated with the implementation of a subscription-based wireless communication service).

As shown in the non-limiting example of FIG. 2, device 201 further comprises at least one trusted memory in which a reference time and related data (for example, a time delta, and the expiration time(s) of alarms) is stored, and can only be accessed by secure timer application 217. According to some embodiments, trusted memory 245 comprises an RPMB located in a memory managed by the TEE. In certain embodiments, trusted memory 245 comprises an embedded secure element (eSE).

According to various embodiments, remote attestation server 230 comprises a remote computing platform (for example, a physical server machine, or a cloud server) which receives and verifies timestamp certificates generated by secure timer application 217 and provided through secure timer service 215 to prevent replay attacks.

Figure 3:
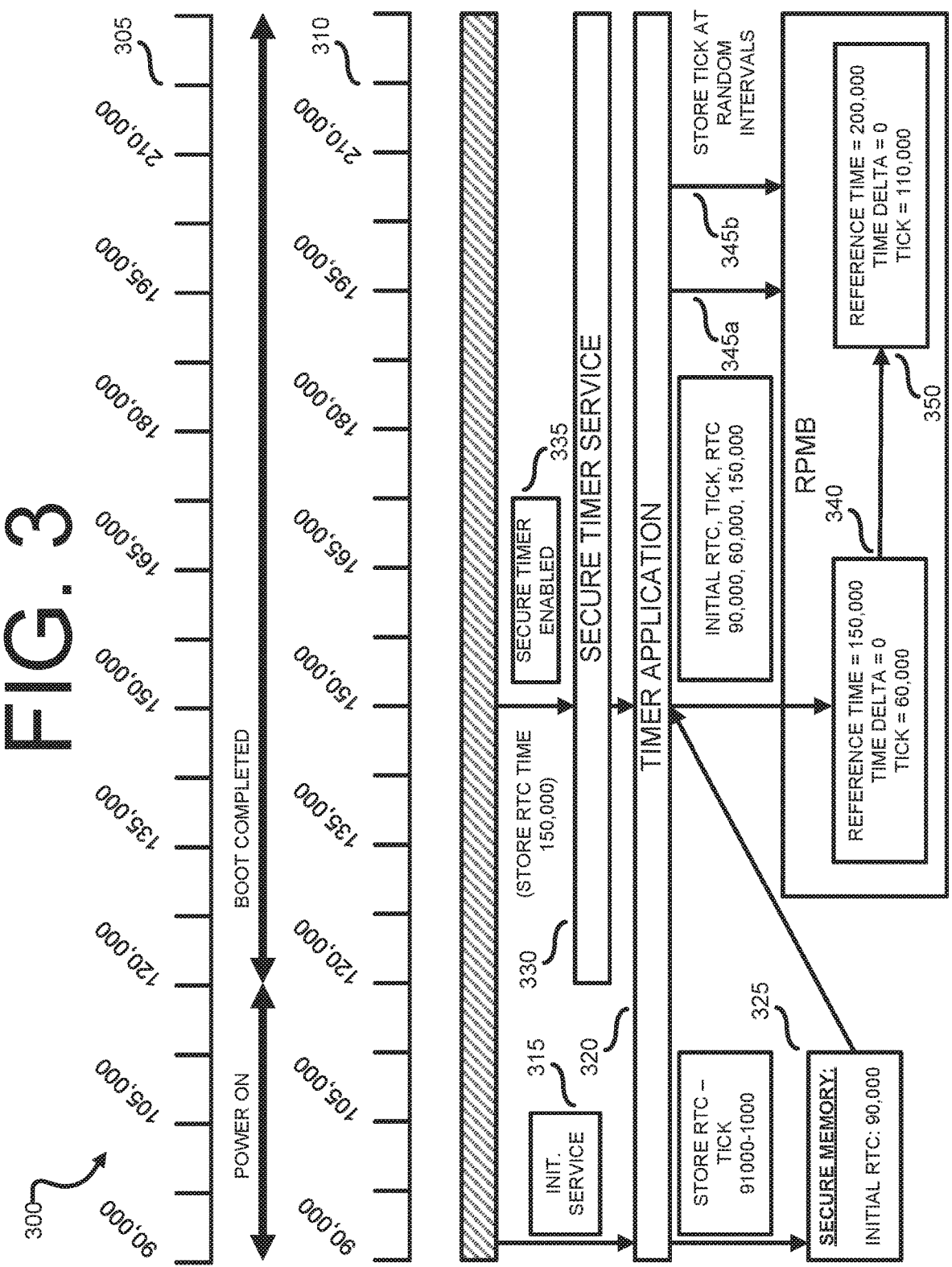
FIG. 3 illustrates an example of a secure timer being enabled in conjunction with anti-rollback according to certain embodiments of this disclosure.

FIG. 3 illustrates an example of a secure timer being enabled in conjunction with anti-rollback according to certain embodiments of this disclosure. The embodiment of the secure timer shown in FIG. 3 is for illustration only and other embodiments could be used without departing from the scope of the present disclosure.

According to certain embodiments of this disclosure, protection against malicious rollback of a device's RTC is achieved by leveraging the functionalities provided by a trusted execution environment (TEE), which is logically and/or physically isolated from the device's operating system (OS), and a trusted memory (such as an RPMB) to provide a trusted RTC measurement which can be relied upon, even if the RTC of the device is compromised. In certain embodiments according to this disclosure, a secure timer application executing in the TEE generates a reference timestamp, which is synchronized with the device's RTC and stored in a trusted memory (for example, an RPMB). In various embodiments, the secure timer application periodically calculates and updates the reference timestamp stored in the trusted memory at predetermined times (including, without limitation, when the device boots up, and when the device's RTC is changed).

Referring to the non-limiting example of FIG. 3, an example 300 of how certain embodiments according to this disclosure generate and update a reference timestamp, which can provide a reliable time measurement, even where a device's real time clock has been rolled back, or re-initialized. In this illustrative example, the operations performed by the device in implementing anti-rollback are shown on a timeline. A first timescale 305 shows time values of an uncompromised real-time clock of an electronic device (for example, device 100) in FIG. 1. In this example, the values of first timescale 305 correspond to counted "ticks" of an uncompromised RTC which is initially synchronized with the device's RTC. In this example, a second timescale 310 shows the values output by a device's RTC, which, as described in subsequent examples, can be manipulated, by, for example, being rolled back or re-initialized. The time values shown on second timescale 310 are likewise, expressed as tick counts. In the illustrative example of FIG. 3, the RTC is not rolled back or otherwise manipulated, and first timescale 305 and second timescale 310 are the same. In other embodiments described herein, the RTC on a device is compromised, and the first and second timescales cease to track each other.

According to certain embodiments, a device (such as, device 100 in FIG. 1) is turned on at a time t=90,000 on the RTC shown in second time scale 310, the act of turning the device on at t=90,000 starts a boot sequence. As shown by block 315, as part of the boot sequence, an initial service (for example, initial service 210 in FIG. 2) is launched at t=91,000, and receives the current value of the device's RTC (t=91,000). In some embodiments according to this disclosure, turning on the device at t=90,000 also starts a secure timer application 320 which runs continuously while the device is on. According to various embodiments, secure timer application 320 runs in a TEE of the device, and implements a separate device clock, or clock tick, for counting the time the device is in an "on" state.

An initial RTC time 325, comprising the RTC time obtained when the initial service is launched minus the tick value at the time the initial service is launched is calculated and stored in a secure memory of the device. According to certain embodiments, the operations of obtaining the initial RTC time and storing the value of the initial RTC time are performed by the initial service. In this illustrative example, the recorded tick value from the timer application at the time the initial service is launched is 1000, so the t=91,000 value received when the initial service is launched is decremented by 1000 ticks, to account for the delay between the device being powered on, and receipt of an initial RTC value at t=91,000.

Referring to the illustrative example of FIG. 3, at time t=120,000, a secure timer service (for example, secure timer service 215 in FIG. 2) is launched. With the secure timer service launched, at time t=150,000, a secure timer 335 (for example, a timer associated with a subscription-based service provided through an application on the device) is enabled. Responsive to enabling secure timer 335, secure timer service 335 obtains the value of the device RTC at the time the secure timer 335 is enabled, and passes this value to timer application 320 to calculate an initial reference time.

According to certain embodiments, the initial reference time is calculated according to Equation 1 as:

$$\text{Initial Ref. Time} = \text{MAX}((\text{Initial RTC time} + \text{Tick Differential}), \text{RTC time}) + \text{Time Delta} \quad (1)$$

Where the tick differential refers to the number of ticks counted by a tick counter in the TEE between turning the device on, and determining a reference time based, in part on the current RTC value. The time delta comprises a difference in tick count value between a calculated reference time and current reference time. In the non-limiting example of FIG. 3, the value of initial RTC time is t=90,000, the tick differential is 60,000 (e.g., 150,000−90,000), the current RTC value is 150,000, and the time delta is zero, because in this illustrative example, the device has not been rolled back, or otherwise tampered with. In this case, both the values of the current device RTC time and the initial RTC time+tick differential yield t=185,000 as the value of the initial reference time.

According to certain embodiments, once the initial reference time is determined, the current reference time 340 is determined according to Equation 2 as:

$$\text{Current Ref. Time} = \text{MAX}((\text{Old Ref. Time} + \text{Tick Differential}), \text{Initial Ref. Time}) \quad (2)$$

Where the "Old Ref. Time" refers to a previously determined reference time value stored in a trusted memory of the device (for example, a rollback-protected memory block or embedded secure element), and the tick differential refers to a counted tick differential between the time at which the old reference time was determined. As shown in the non-limiting example of FIG. 3, the reference time is being calculated for the first time, and there is no old reference time. Thus, the current reference time 340 is determined to be the initial reference time, t=150,000. Further, as shown in FIG. 3, the current reference time 340 is stored in a trusted memory of the device.

As shown in the non-limiting example of FIG. 3, according to certain embodiments, the timer application periodically stores the clock tick values from the timer application at random intervals, in the trusted memory of the device, including, for example, random intervals 345a and 345b in FIG. 3. The value of the reference time stored in the trusted memory is periodically updated to reflect the stored tick values, as shown by updated value 350, which reflects a 50,000 tick increment since reference time 340 was determined.

Figure 4:
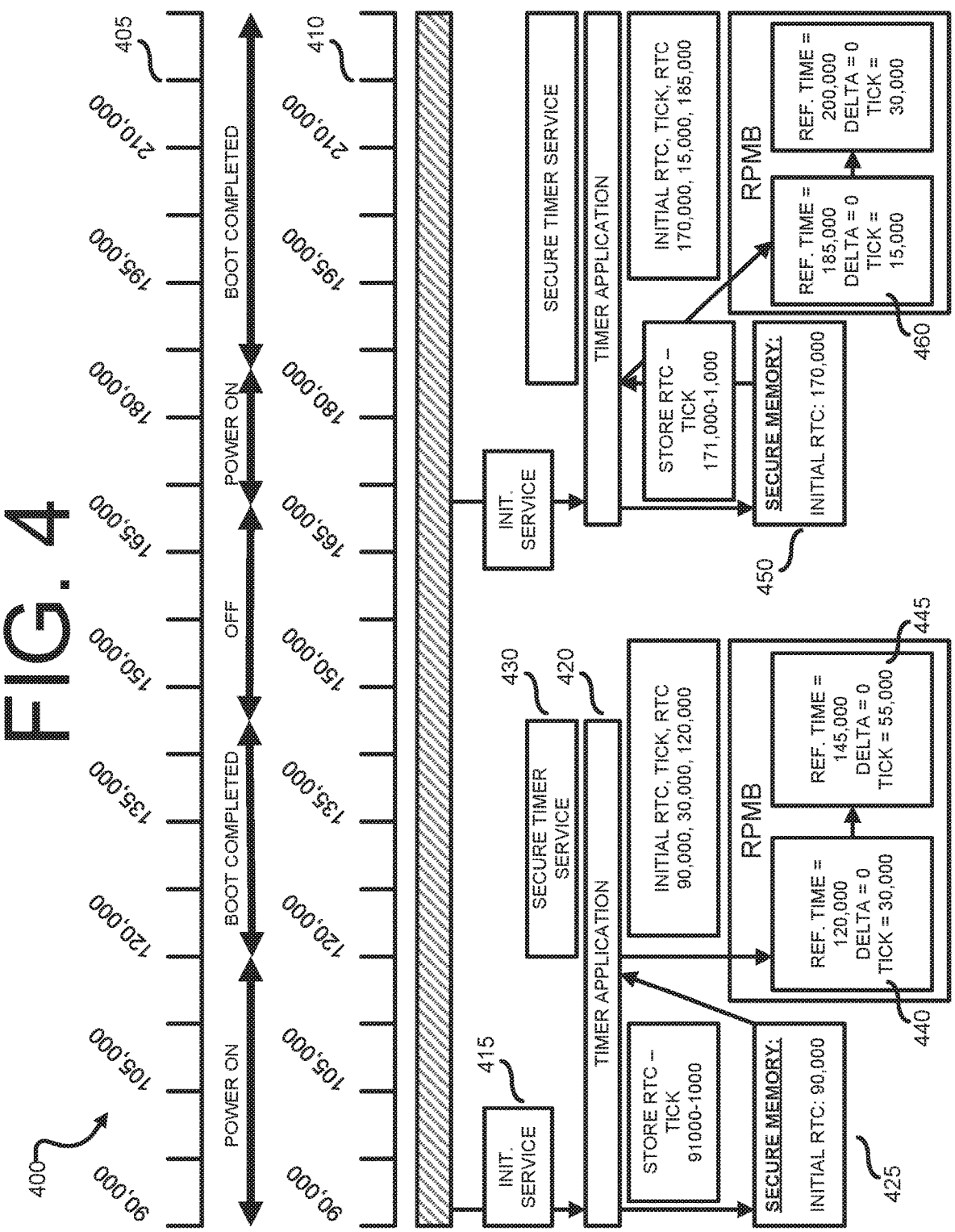
FIG. 4 illustrates an example of implementing anti-rollback across device restarts according to some embodiments of this disclosure.

FIG. 4 illustrates an example 400 of implementing anti-rollback across device restarts according to some embodiments of this disclosure. The example 400 shown in FIG. 4 is for illustration only and other examples could be used without departing from the scope of the present disclosure.

Referring to the non-limiting example of FIG. 4, example 400 generally tracks the format of example 300, with a first timescale 405 expressing time on an uncompromised RTC and a second timescale 410 expressing time as reported by a device RTC. In the illustrative example of FIG. 4, first timescale 405 corresponds to second timescale 410 throughout the figure, as there is no attempt to rollback or reinitialize a device RTC.

As shown in FIG. 4, at time t=90,000 the device is turned on, with initial service 415 obtaining a device RTC value at t=91,000. Using a tick count from timer application 420 indicating 1000 ticks having passed between powering the device on at t=90,000 and obtaining the device RTC value, an initial RTC value 425 of 90,000 is determined and stored in a secure memory of the device. At time t=120,000, the device launches secure timer service 430, which obtains an initial device RTC value 425 of t=120,000.

Having received the device RTC value of t=120,000, timer application 420 calculates a value of an initial reference time. In this example, because there has been no prior adjustment of the device's RTC, the time delta is zero, and the initial reference time is calculated as t=120,000, which corresponds to the joint maximum (e.g., both values are, in this case, the same) of the initial RTC time (t=90,000) plus the tick differential (t=30,000) between startup and determining the initial reference time, as well as the current device RTC time (t=120,000). In the absence of a previously stored, or old reference time, the initial reference time, with a value of t=120,000 is stored in the trusted memory as reference time 440. Clock ticks from the timer application are periodically (for example, at random intervals, or in response to certain user inputs, such as an input shutting down the device). As shown in FIG. 4, the reference time is updated based on a clock tick at t=145,000, in response to a user input causing the device to be shut down at time t=145,000.

Referring to the non-limiting example of FIG. 4, from time t=145,001 to t=169,999, the device is in an "off" state, and is turned back on again at t=170,000. As the device is booting up again, the initial service obtains the current device RTC value, this time at t=171,000. Timer application calculates a second initial RTC value 450 based on the RTC value obtained by the initial service, minus a time differential between the start of the device and receiving current RTC value, t=171,000. In this example, the measured tick differential between powering on at t=170,000 and receiving current RTC value t=171,000 is 1000 ticks, meaning that second initial RTC value 450 is t=170,000. At t=185,000, secure timer service 430 launches again, and the device recalculates the initial reference time, based on second initial RTC value, t=170,000, a tick differential of 15,000, and a current RTC time value of t=185,000). In this example, there have been no prior attempts to manipulate the RTC, and the value of delta is zero. Accordingly, the initial reference time is t=185,000, which is the joint maximum of the second initial RTC time plus the tick differential, and the current RTC value. Having determined the initial reference time, the maximum of the old reference time plus the tick differential, and the initial reference time is taken to determine an updated reference time 460. In this example, the old reference time is t=145,000, which corresponds to the last reference time value stored in the trusted memory before the device powered off at time 145,000. Accordingly, the old reference time plus the tick differential gives a value of t=160,000, which is less than the initial reference time, t=185,000. Thus, in this case, the initial reference time, t=185,000 is stored in the trusted memory as updated reference time 460. According to certain embodiments, the trusted memory periodically receives tick interval data from timer application 420 and increments the value of the reference time in the trusted memory according to the received tick counts. For example, after receiving tick interval data showing 30,000 ticks having passed between powering the device on at time t=170,000 (on first timescale 405), reference time 460 is incremented by 15,000 to a value of t=200,000.

Figure 5:
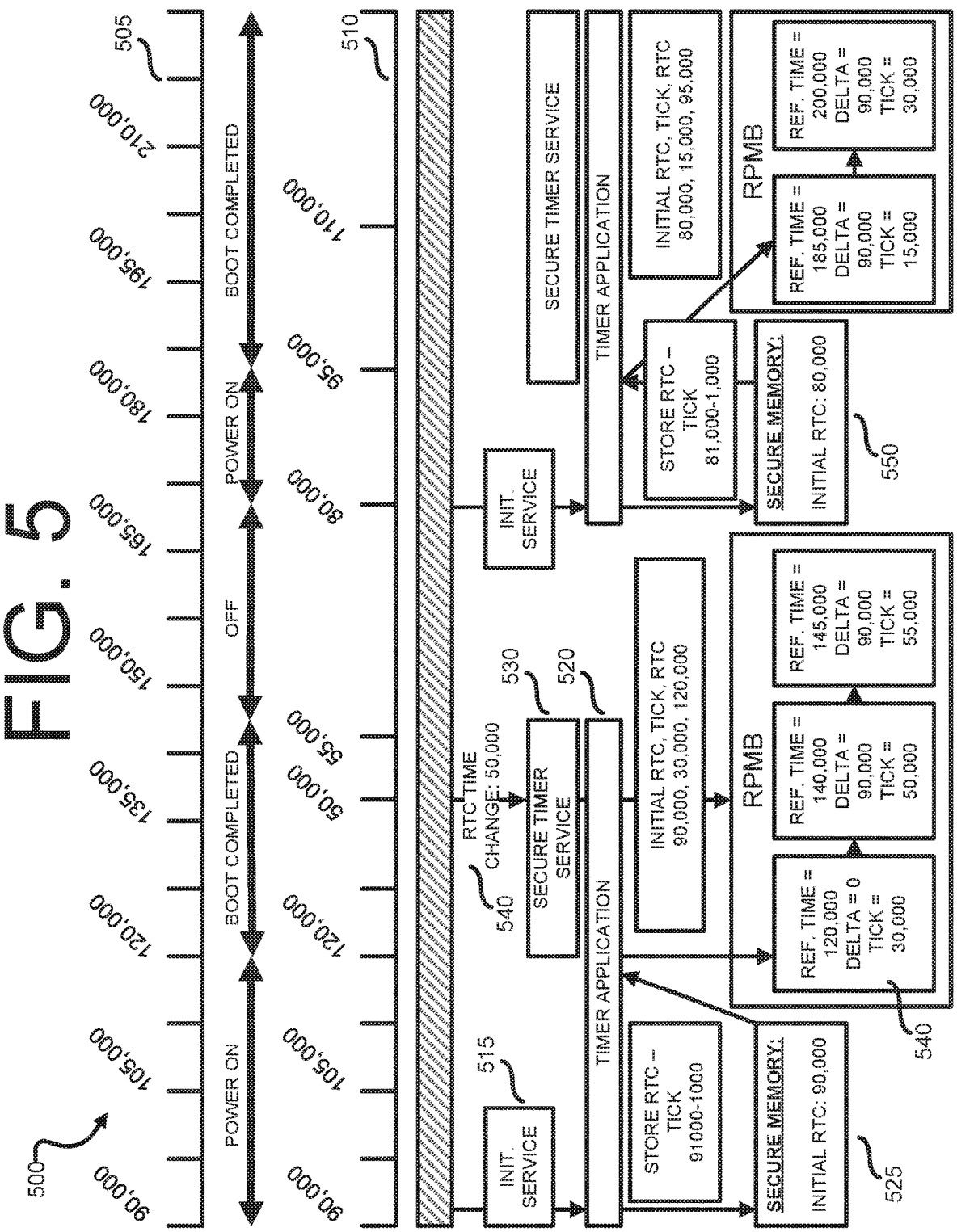
FIG. 5 illustrates an example of anti-rollback in response to a rollback of a real time clock, according to certain embodiments of this disclosure.

FIG. 5 illustrates an example 500 of anti-rollback in response to a rollback of a real time clock, according to certain embodiments of this disclosure. The example 500 shown in FIG. 5 is for illustration only and other examples could be used without departing from the scope of the present disclosure.

Referring to the non-limiting example of FIG. 5, a first timescale 505, corresponding to tick values output by an uncompromised RTC initially synchronized to a device RTC is shown. A second timescale 510 shows the values output by the device RTC. As is apparent from FIG. 5 and the description thereof, in example 500, the device RTC is rolled back, and outputs different time values over a portion of the time shown in FIG. 5.

As shown in FIG. 5, at time t=90,000 the device is turned on, with initial service 515 obtaining a device RTC value at t=91,000. Using a tick count from timer application 520 indicating 1000 ticks passed between powering the device on at t=90,000 and obtaining the current device RTC value, an initial RTC value 525 of 90,000 is determined and stored in a secure memory of the device. At time t=120,000, the device launches secure timer service 530, which obtains a device RTC value of t=120,000.

Having received the device RTC value of t=120,000, timer application 520 calculates a value of an initial reference time. In this example, because there has been no prior adjustment of the device's RTC, the time delta is zero, and the initial reference time is calculated as t=120,000, which corresponds to the joint maximum (e.g., both values are, in this case, the same) of the initial RTC time (t=90,000) plus the tick differential (t=30,000) between startup and determining the initial reference time, as well as the current device RTC time (t=120,000). In the absence of a previously stored, or old reference time, the initial reference time, with a value of t=120,000 is stored in the trusted memory as reference time 540. As shown in illustrative example 500, the timer application periodically provides the trusted memory (in this case, the RPMB) with tick intervals, and the value of the reference time 540 is periodically incremented based on the tick values. In this case, reference time 540 is shown as being incremented based on tick interval information twice, from t=120,000 to t=140,000 and again to t=145,000.

At t=140,000 on first timescale, the RTC value is changed, and rolled back to a value of t=50,000, by, for example, rolling back the RTC manually, or through a network time protocol spoofing attack. According to certain embodiments, RTC time change 541 is detected by secure timer service 530, and timer application 520 calculates a time delta in response to the rollback of the RTC. According to certain embodiments, the time delta is calculated according to Equation 3 as:

$$\text{Time Delta} = \text{Current Reference Time} - \text{Current RTC value} \quad (3)$$

As shown in the illustrative example of FIG. 5, RTC time change 541 occurred at time t=140,000 (as shown on first timescale 505). At time t=140,000 (again, on first timescale 505), reference time value 540 was updated in response to a tick interval data provided by timer application 520. According to certain embodiments, timer application 520 and secure timer service 530 are configured to pass tick count information to the trusted memory storing the reference time in response to detecting a rollback or other manipulation of a device RTC. According to certain embodiments, in response to detecting RTC time change 541, timer application determines the time delta. In this illustrative example, the time delta is calculated as 90,000 ticks, corresponding to the current reference time (t=140,000) at the time of RTC time change 541, minus the current RTC value (t=50,000) at the time of RTC time change 541. As shown in FIG. 5, the calculated time delta is stored in a trusted memory (for example, the RPMB), along with the current reference time.

Referring to the non-limiting example of FIG. 5, at time t=55,000 (on second timescale 510), the device is turned off. In this illustrative example, a final tick interval is passed to the trusted memory, and reference time 540 is incremented to a value of t=145,000. From time t=55,001 to t=79,999 (according to second timescale 510), the device is in an "off" state.

Responsive to the device being turned back on again at time t=80,000 (on second timescale 510), timer application 520 resumes counting ticks, and at time t=81,000 (on second timescale 510), initial service 515 obtains t=81,000 as the current RTC value. As shown in the illustrative example of FIG. 5, timer application 520 determines a second initial RTC value 550, based on the current RTC value minus the tick count between powering up and initial service 515 obtaining the current RTC value. In this illustrative example, second initial RTC valued 550 is determined to be t=80,000 (on second timescale 510).

At time t=95,000 secure timer service 530 launches again, and responsive to secure timer service 530 launching, timer application 520 determines a second initial reference time. In this illustrative example, a time delta of 90,000 ticks was previously stored in the RPBM, subsequent to RTC time change 541. Applying Equation 1, the second initial reference time is determined to be t=185,000, which, in this case corresponds to the joint maximum of the second initial reference time plus the tick differential (80,000+15,000=95,000) and the current RTC time (t=95,000) plus the time delta (90,000 ticks) stored in the RPMB. According to certain embodiments, Equation 2 is applied to determine the current reference time. As shown in FIG. 5, the old value of reference time 540 is 145,000, corresponding to the value of the reference time at the time the device was powered down at t=55,000 (according to second timescale 510). Applying Equation 2, the value of second initial reference time (t=185,000) is greater than the value of the old reference time (t=145,000) plus the tick differential (15,000). Accordingly, the second initial reference time is stored in the RPMB as the reference time. As shown in FIG. 5, timer application 520 periodically passes tick interval data to the RPMB, and the value of reference time is incremented accordingly. According to certain embodiments, after determining the reference time, timer application 520 also recalculates the time delta. In this non-limiting example, applying Equation 3 to the value of the reference time (t=185,000) to the current RTC time (t=95,000) results in an unchanged time delta value of 90,000.

Figure 6:
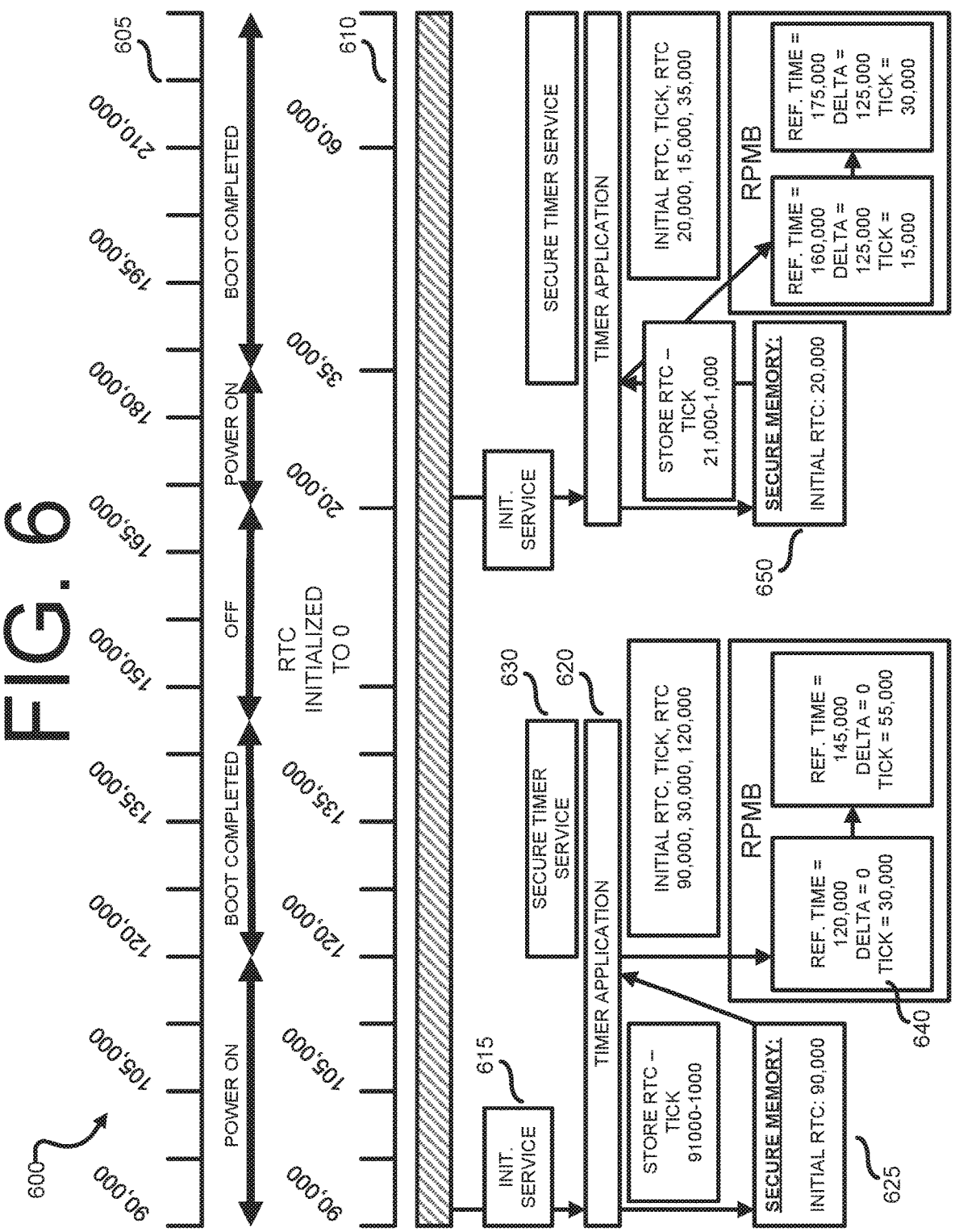
FIG. 6 illustrates an example of anti-rollback in response to an initialization of a real time clock, according to various embodiments of this disclosure.

FIG. 6 illustrates an example 600 of anti-rollback in response to initialization of a device RTC, according to certain embodiments of this disclosure. The example 600 shown in FIG. 6 is for illustration only and other examples could be used without departing from the scope of the present disclosure.

Referring to the non-limiting example of FIG. 6, a first timescale 605, corresponding to tick values output by an uncompromised RTC initially synchronized to a device RTC is shown. A second timescale 610 shows the values output by the device RTC. As is apparent from FIG. 6 and the description thereof, in example 600, the device RTC is initialized at time t=145,000 (on first timescale 605) and outputs different time values over a portion of the time shown in FIG. 6.

As shown in the illustrative example of FIG. 6, at time t=90,000 the device is turned on, with initial service 615 obtaining a device RTC value at t=91,000. Using a tick count from timer application 620, which indicates 1000 ticks having passed between powering the device on at t=90,000 and obtaining the current RTC value, an initial RTC value 625 of 90,000 is determined and stored in a secure memory of the device. At time t=120,000, the device launches secure timer service 630, which obtains a device RTC value of t=120,000.

Having received the device RTC value of t=120,000, timer application 620 calculates a value of an initial reference time. In this example, because there has been no prior adjustment of the device's RTC, the time delta is zero, and the initial reference time is calculated as t=120,000, which corresponds to the joint maximum (e.g., both values are, in this case, the same) of the initial RTC time (t=90,000) plus the tick differential (t=30,000) between startup and determining the initial reference time, as well as the current device RTC time (t=120,000). In the absence of a previously stored, or old reference time, the initial reference time, with a value of t=120,000 is stored in the trusted memory as reference time 640. As shown in illustrative example 600, the timer application periodically provides the trusted memory (in this case, the RPMB) with tick intervals, and the value of the reference time 640 is periodically incremented based on the tick values. In this case, reference time 640 is shown as being incremented based on tick interval information twice, from t=120,000 to t=140,000 and again to t=145,000.

As shown in FIG. 6, at time t=145,000 (on first timescale 605), the device is powered down, and the RTC is initialized to a value of t=0. According to certain embodiments, at time t=20,000 (on second timescale 610), the device is turned back on, and at time t=21,000 (on second timescale 610), initial service 615 obtains the current RTC value, which in this case, is 21,000. In this illustrative example, timer application determines a second initial RTC value 650 by decrementing the current RTC value by a tick count between powering the device back on and initial service 615 obtaining the current RTC value. In this case, the second initial RTC value 650 is t=20,000. At t=35,000 (on second timescale 610) secure timer service 630 is launched, and timer application 620 receives the current RTC value (t=35,000) to determine a second initial reference time. When the device was turned off at t=140,000 (on first timescale 605), no adjustment to the device RTC had occurred. As such, the time delta value stored in the trusted memory of the device (in this non-limiting example, an RPMB) is zero.

Applying Equation 1 yields a second initial reference time of t=35,000, which is the joint maximum of second initial RTC value 650 (t=20,000) plus the tick differential (15,000 ticks) between the time of powering the device up and calculating the initial reference time, and the RTC time value at the time of calculating the initial reference time (t=35,000).

As discussed herein, a reference time value of t=145,000 was stored in the RPMB at t=145,000 (on first timescale 605) when the device was powered down after first being turned on at t=90,000 (on first timescale 605). Applying Equation 2 to determine the current reference time yields a value of t=160,000 as the new reference time, as 160,000 (the old reference time (145,000)+the tick differential between device on and launching the secure timer service (15,000 ticks)) is greater than the second initial reference time (t=35,000). Accordingly, and as shown in FIG. 6, at t=160,000, which corresponds to the new value of reference time 640 is stored in the RPMB, and periodically incremented with tick interval data provided by timer application 620.

According to certain embodiments, at t=35,000 (on second timescale 610), the device also recalculates the time delta and stores the time delta value in the RPMB. Applying Equation 3, subtracting the current RTC time value (t=35,000) from the current value of reference time 640 (t=160,000) yields a time delta value of 125,000.

As shown in the example of FIG. 6, embodiments according to this disclosure substantially mitigate the effect of very large changes of the device RTC. In the non-limiting example of FIG. 6, the initialization of the device RTC creates a 145,000 tick time discrepancy between first timescale 605 and second timescale 610. Despite this, the difference between the post-initialization reference time 640 and first timescale 605 is only 20,000 ticks.

Figure 7:
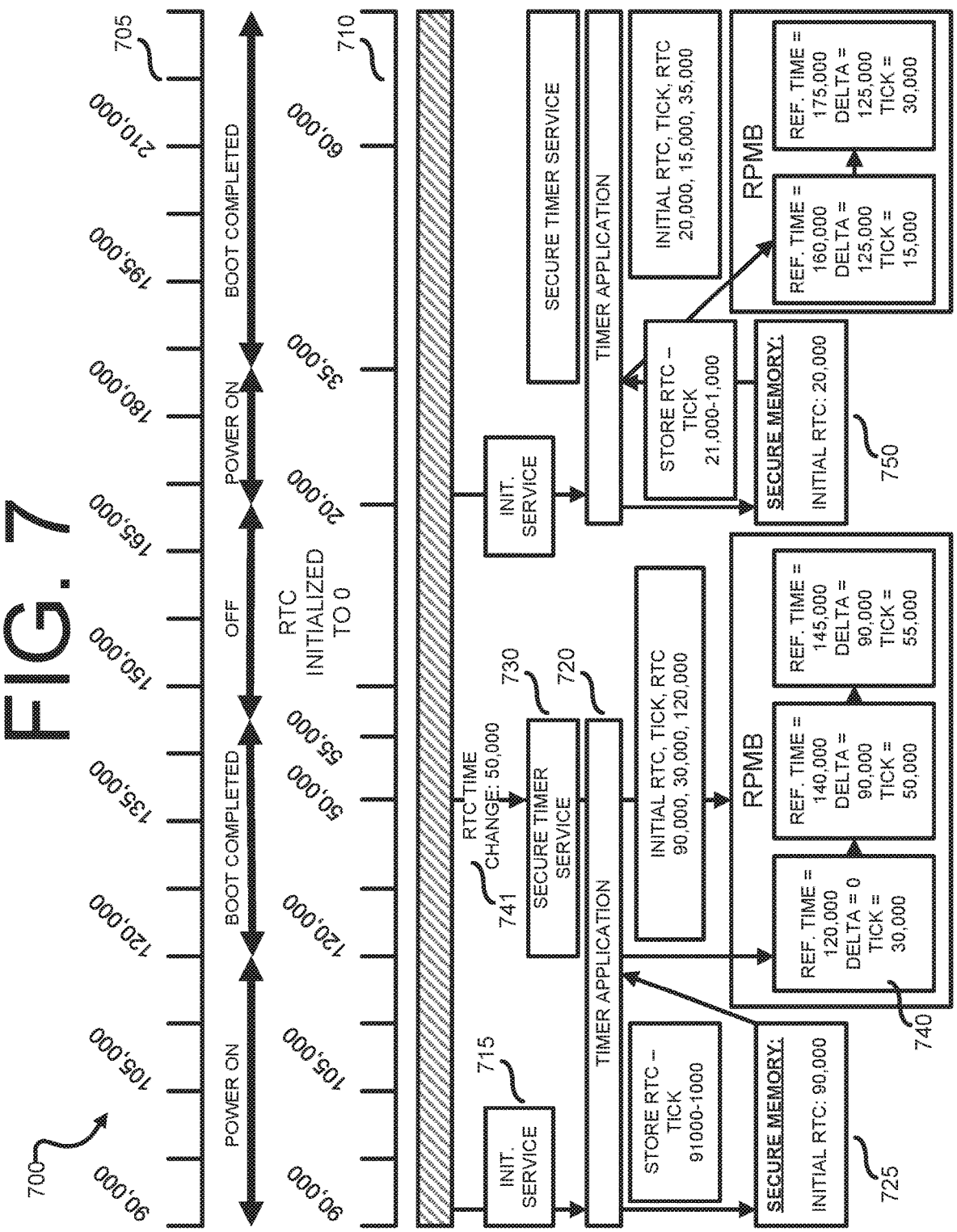
FIG. 7 illustrates an example of anti-rollback in response to rollback and initialization of a real time clock, according to some embodiments of this disclosure.

FIG. 7 illustrates an example of anti-rollback in response to a rollback and initialization of a device RTC, according to various embodiments of this disclosure. The example 700 shown in FIG. 7 is for illustration only and other examples could be used without departing from the scope of the present disclosure.

Referring to the non-limiting example of FIG. 7, a first timescale 705, corresponding to tick values output by an uncompromised RTC initially synchronized to a device RTC, is shown. A second timescale 710, shows the values output by the device RTC.

As shown in the illustrative example of FIG. 7, at time t=90,000 the device is turned on, with initial service 715 obtaining a device RTC value at t=91,000. Using a tick count from timer application 720, which indicates 1000 ticks having passed between powering the device on at t=90,000 and obtaining the current RTC value, an initial RTC value 725 of 90,000 is determined and stored in a secure memory of the device. At time t=120,000, the device launches secure timer service 730, which obtains a device RTC value of t=120,000.

Having received the device RTC value of t=120,000, timer application 720 calculates a value of an initial reference time. In this example, because there has been no prior adjustment of the device's RTC, the time delta is zero, and the initial reference time is calculated using Equation 1 as t=120,000, which corresponds to the joint maximum (e.g., both values are, in this case, the same) of the initial RTC time (t=90,000) plus the tick differential (t=30,000) between startup and determining the initial reference time, as well as the current device RTC time (t=120,000). In the absence of a previously stored, or old reference time, the initial reference time, with a value of t=120,000 is stored in the trusted memory as reference time 640.

As shown in the non-limiting example of FIG. 7, at periodic intervals, the RPMB receives tick interval data from timer application 720, and increments as the value of reference time 740 in response to receiving tick interval data. At time t=135,000 (on first timescale 705), RTC time change 741 occurs, and the device RTC is rolled back to a value of t=50,000. As shown in non-limiting example 700, responsive to detecting RTC time change 741, timer application recalculates the value of the time delta between the reference time and the RTC time, and stores the calculated time delta value in the trusted memory (for example, an RPMB or eSE). Applying Equation 3, the time delta after RTC change 741 is determined to be 90,000.

Referring to the non-limiting example of FIG. 7, at time t=140,000 (on first timescale 705), the device is both powered off, and the device's RTC is initialized. At time t=20,000 (on second time scale 710), the device is turned back on. At time t=21,000 (on second timescale 710), initial service 715 is launched, and obtains t=21,000 as the current RTC value. According to certain embodiments, timer application 720 determines a second initial RTC time 750 by subtracting a tick count of the interval between turning the device back on, and obtaining the current RTC time. In this illustrative example, t=20,000 is determined as the second initial RTC time 750. At t=35,000 (on second timescale 710), secure timer service 730 is launched again, and timer application 720 obtains the current RTC value to determine a second initial reference time. As shown in the illustrative example of FIG. 7, applying Equation 1 to second initial RTC value 750, the tick interval of 15,000 ticks between powering the second initial RTC and calculation of the second initial reference time, and the current RTC of t=35,000 results in an initial reference time of t=35,000.

Applying Equation 2, using the second initial reference time, the old reference time stored in the RPMB (t=145,000), the stored time delta value (90,000 ticks), and the time interval between the second initial RTC and the calculation time, t=160,000 is determined as the current value of reference time 740. According to certain embodiments, in addition to calculating the current value of reference time 740, timer application 720 also calculates a current value of the time delta between the current value of reference time 740 and the current value of the RTC. Applying Equation 3, a time delta of 125,000 ticks is calculated and stored in the RPMB. In certain embodiments according to this disclosure, the RPMB periodically receives tick interval data, and responsive to receiving the tick interval data, increments the value of reference time 740, as shown in the illustrative example of FIG. 7.

Figure 8:
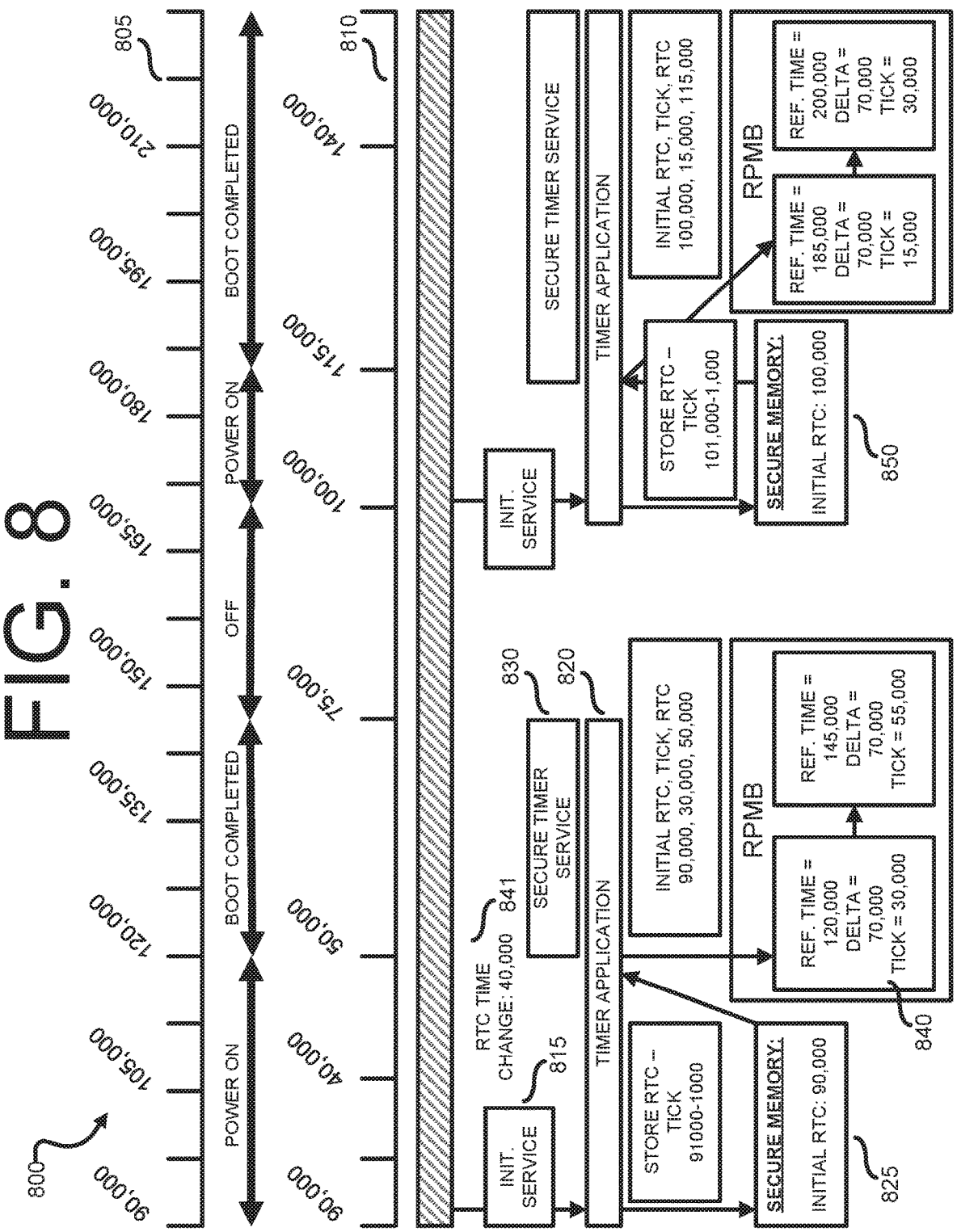
FIG. 8 illustrates an example of anti-rollback in response to rollback occurring before a boot sequence of a device is complete, according to certain embodiments of this disclosure.

FIG. 8 illustrates an example 800 of anti-rollback in response to rollback occurring before a boot sequence of the device is complete, according to various embodiments of this disclosure. The example 800 shown in FIG. 8 is for illustration only and other examples could be used without departing from the scope of the present disclosure.

Referring to the non-limiting example of FIG. 8, two timescales are shown. First timescale 805 provides a timeline (expressed in ticks of a RTC) of an uncompromised (for example, an RTC which has not been rolled back or initialized) device RTC. Second timescale 810, provides a timeline of the outputs of a device RTC which can be manipulated (for example, by being rolled back).

As shown in the non-limiting example of FIG. 8, at time t=90,000 (on first timescale 805), the device (for example, device 1 in FIG. 1) is powered on, which starts a tick counter of a secure timer application 820. At time t=91,000, initial service 815 obtains the current RTC value of the device RTC, which in this illustrative example, t=91,000 (on second timescale 810). Using the current device RTC value (t=91,000) and a tick count of the interval between powering on and obtaining the current RTC value, timer application 820 calculates an initial RTC value 825 of t=90,000.

According to certain embodiments, an RTC time change 841 occurs at t=110,000 (on first timescale 805), wherein the device RTC is rolled back to a value of t=40,000. In this explanatory example, the rollback occurs before timer application 820 is triggered (for example, in response to the launch of secure timer service 830) to obtain a current RTC value for calculating an initial reference time and reference time. As shown below, in this illustrative example, the early timing of the rollback of the RTC has no effect on the device's ability to determine a reference time 840 which is synchronized with first timescale 805.

As shown in the illustrative example of FIG. 8, at time t=50,000 (on second timescale 810), timer application 820 obtains the current RTC value, which, in this case is t=50,000. Applying Equation 1, the initial reference time is determined to be t=120,000, which corresponds to the initial RTC time (t=90,000) plus the tick interval between powering the device on and calculating the initial reference time, which is also greater than the current RTC time (t=50,000). Further, in the absence of an old reference time value stored in a trusted memory (for example, an RPMB), the initial reference time is, by default, the maximum, and is stored in the RPMB as reference time 840. According to certain embodiments, responsive to calculating reference time 840, timer application 820 also calculates the value of the time delta. Applying Equation 3, 70,000 ticks, or the difference between reference time 840 and the current RTC time, is stored in the RPMB as the time delta. As shown in FIG. 8, timer application 820 periodically provides the RPMB tick interval data (for example, at random intervals, and in response to triggering events, such as a user command to power down a device). According to certain embodiments, the value of reference time 840 is incremented upwards in response to the received tick interval data. As shown in FIG. 8, the device is powered down at t=145,000 (on first timescale 805), and the value of reference time 840 is incremented based on tick interval data showing a 25,000 tick interval since reference time 840 was initially calculated.

According to certain embodiments, at time t=100,000 (on second timescale 810), the device is switched from an off state to an on state. Accordingly, at time t=101,000 (on second timescale 810), initial service 815 obtains the current RTC value, which, in this case, is t=101,000. In some embodiments, timer application 820 subtracts its tick count measuring the interval between starting the device again and obtaining the current RTC value to obtain a second initial RTC value of t=100,000 (t=101,000−1000 ticks). At time t=115,000, in response to a triggering condition (for example, launching secure timer service 830, timer application obtains the current RTC value and calculates the value of the second initial reference time. Applying Equation 1, the second initial reference time is calculated as t=185,000, which is the joint maximum of: a.) the initial reference time (t=100,000) plus the tick interval (15,000 ticks), plus the time delta (70,000 ticks) stored in the RPMB; and b.) the current RTC (t=115,000) plus the time delta (70,000 ticks). Applying Equation 2, timer application 820 then calculates the current value of the reference time 840 as t=185,000, which is greater than the old reference time (t=145,000) plus the tick interval (15,000 ticks). According to certain embodiments, and as shown in FIG. 8, the current value of reference time 840 is stored in the RPMB and periodically incremented in response to tick interval data provided by timer application 820.

Figure 9:
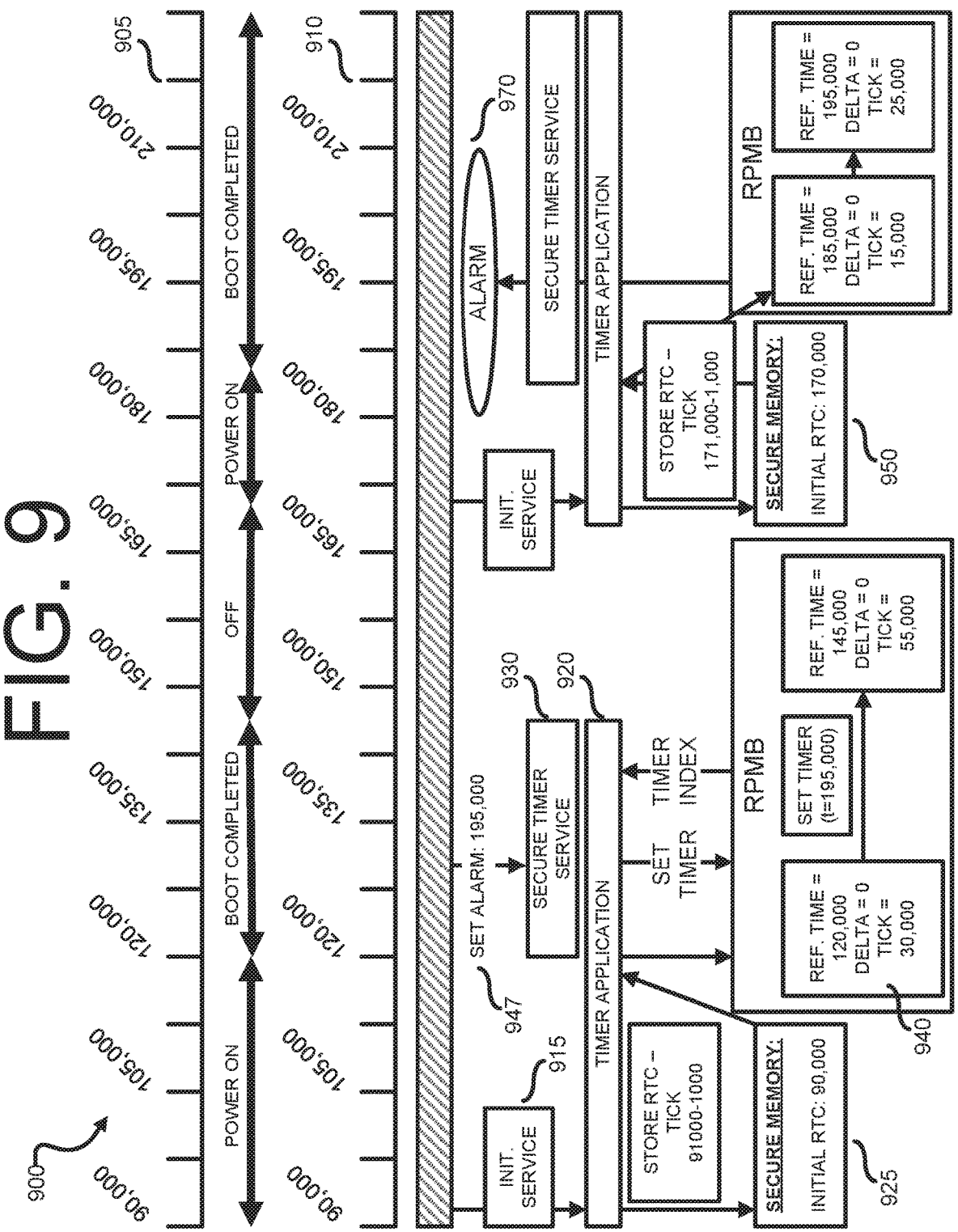
FIG. 9 illustrates an example of anti-rollback and implementing an RTC timer service across restarts, according to some embodiments of this disclosure.

FIG. 9 illustrates an example 900 of anti-rollback and implementation of an RTC timer service across device restarts, according to some embodiments of this disclosure. The example 900 shown in FIG. 9 is for illustration only and other examples could be used without departing from the scope of the present disclosure.

Referring to the non-limiting example of FIG. 9, two timescales are shown. First timescale 905 provides a timeline (expressed in ticks of a RTC) of an uncompromised (for example, an RTC which has not been rolled back or initialized) device RTC. Second timescale 910, provides a timeline of the outputs of a device RTC which can be manipulated (for example, by being rolled back. While, in the illustrative example of FIG. 9, the device RTC is not rolled back or otherwise manipulated, the principles of operation described with reference to FIG. 9 still apply in instances where the device RTC has been manipulated (for example, by a manual rollback or RTP spoofing attack).

As shown in the non-limiting example of FIG. 9, at time t=90,000 (on first timescale 905), the device (for example, device 1 in FIG. 1) is powered on, which starts a tick counter of a secure timer application 920. At time t=91,000, initial service 915 obtains the current RTC value of the device RTC, which in this illustrative example, t=91,000 (on second timescale 910). Using the current device RTC value (t=91,000) and a tick count of the interval between powering on and obtaining the current RTC value, timer application 920 calculates an initial RTC value 925 of t=90,000.

At t=120,000 (on first timescale 905), in response to a triggering event (for example, launching secure timer service 930, or a gating point (for example, the end) of a boot sequence), timer application 920 obtains the current device RTC value, in order to calculate a reference time.

According to various embodiments, having received the current device RTC value of t=120,000, timer application 920 calculates a value of an initial reference time, using Equation 1. In this example, because there has been no prior adjustment of the device's RTC, the time delta is zero, and the initial reference time is calculated as t=120,000, which corresponds to the joint maximum (e.g., both values are, in this case, the same) of the initial RTC time (t=90,000) plus the tick differential (t=30,000) between startup and determining the initial reference time, as well as the current device RTC time (t=120,000). In the absence of a previously stored, or old reference time, the initial reference time, with a value of t=120,000 is stored in the trusted memory as reference time 940. Clock ticks from the timer application 920 are periodically (for example, at random intervals, or in response to certain user inputs, such as an input shutting down the device). As shown in the illustrative example of FIG. 9, the reference time is updated based on a clock tick at t=145,000, in response to a user input causing the device to be shut down at time t=145,000.

As shown in the non-limiting example of FIG. 9, at t=130,000 the device receives a trigger 947 to set an alarm to expire at t=195,000 (on first timescale 905). According to some embodiments, trigger 947 is set by a mobile device management (MDM) request from a service provider (for example, a wireless communication provider) for an alarm 970 associated with the service (for example, an alarm indicating the termination date of a service contract) to occur at a certain time. In some embodiments, trigger 947 is received by secure timer service 930 from an external entity, such as a mobile management entity (MME) or an attestation server (for example, remote attestation server 230 in FIG. 2). According to some embodiments, trigger 947 is set through an application (for example, an application that allows users to "rent" video files of movies for a specified period of time) executing on the device.

Referring again to the non-limiting example of FIG. 9, as part of setting alarm 970, timer application 920 also stores the expiration time for the alarm as a value relative to the current reference time. In this example, the expiration time for the alarm is set as t=195,000, reflecting the fact that the device RTC has not been rolled back or otherwise manipulated.

Referring to the non-limiting example of FIG. 9, from time t=145,001 to t=169,999, the device is in an "off" state, and is turned back on again at t=170,000. As the device is booting up again, the initial service obtains the current device RTC value, this time at t=171,000. Timer application 920 calculates a second initial RTC value 950 based on the RTC value obtained by the initial service, minus a time differential between the start of the device and receiving current RTC value, t=171,000. In this example, the measured tick differential between powering on at t=170,000 and receiving current RTC value t=171,000 is 1000 ticks, meaning that second initial RTC value 450 is t=170,000. At t=185,000, secure timer service 930 launches again, and the device recalculates the initial reference time, based on second initial RTC value, t=170,000, a tick differential of 15,000, and a current RTC time value of t=185,000). In this example, there have been no prior attempts to manipulate the RTC, and the value of delta is zero. Accordingly, the initial reference time is t=185,000, which is the joint maximum of the second initial RTC time plus the tick differential, and the current RTC value. Having determined the initial reference time, the maximum of the old reference time plus the tick differential, and the initial reference time is taken to determine an updated reference time 960. In this example, the old reference time is t=145,000, which corresponds to the last reference time value stored in the trusted memory before the device powered off at time 145,000. Accordingly, the old reference time plus the tick differential gives a value of t=160,000, which is less than the initial reference time, t=185,000. Thus, in this case, the initial reference time, t=185,000 is stored in the trusted memory as updated reference time 960. According to certain embodiments, the trusted memory periodically receives tick interval data from timer application 920 and increments the value of the reference time in the trusted memory according to the received tick interval data. For example, after receiving a tick interval of 25,000 (referring to the interval between the current time and powering on at t=170,000), reference time 460 is incremented by 10,000 to a value of t=195,000.

According to certain embodiments, timer application 920 periodically compares the current value of updated reference time 960 stored in the RPMB against the reference time for alarm 970 stored in the RPMB. In some embodiments, when updated reference time 960 matches or exceeds the reference time for alarm 970 stored in the RPMB, timer application 920 generates an alarm expiration certificate. Depending on the operating system utilized by the device, the alarm expiration certificate may, to enhance security, be generated in a trusted execution environment (for example, TEE 167 in FIG. 1) as an attestation blob, which secure timer service 930 sends to a remote attestation server (for example, remote attestation server 230 in FIG. 2). According to certain embodiments, transmission of the alarm expiration certificate operates to prevent or mitigate the risk of a replay attack. Responsive to receiving the alarm expiration certificate, the remote attestation server validates and acknowledges the expiration of the alarm by generating and transmitting an attestation result certificate to secure timer service 930. In certain embodiments, secure timer service 930 validates the attestation result certificate, and based on the validation, notifies one or more applications on the device to take an action (for example, cutting off a service provided by the application) associated with the expiration of alarm 970.

FIG. 10 illustrates an example of operations of a method 1000 for implementing anti-rollback according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, an electronic device.

Referring to the non-limiting example of FIG. 10, at operation 1005, a secure timer application (for example, secure timer application 217 in FIG. 2, or timer application 820 in FIG. 8) determines an initial reference time value based on an initial value of a real time clock (for example, device RTC 205 in FIG. 2) based on an initial value of a device RTC (for example, initial RTC value 425 in FIG. 4) and a time delta value (for example, a time delta value stored in a trusted memory, such as an RPMB). According to certain embodiments, the initial reference time is determined according to Equation 1 of this disclosure.

According to various embodiments, at operation 1010, the secure timer application determines an updated reference time value (for example, reference time 640 in FIG. 6) based on an initial reference time value (for example, the initial reference time value determined at operation 1015), and a second value of the RTC (for example, the value of the RTC at the time the initial reference time value was calculated). In various embodiments according to this disclosure, the updated reference time is determined using Equation 2 as disclosed and described herein.

As shown in the illustrative example of FIG. 10, at operation 1015, the timer application determines an updated time delta value based on the second value of the device RTC and the updated reference time value (for example, the updated reference time value determined in operation 1015.) According to some embodiments, the updated time delta value is determined according to Equation 3, as disclosed and described herein.

Referring to the non-limiting example of FIG. 10, at operation 101, the secure timer application stores both the updated time delta value and the updated reference time value in a trusted memory of the device (for example, trusted memory 245 in FIG. 2). Once stored, the updated reference value becomes a previously stored old reference value for the purposes of subsequent iterations of operation 1010.

Figure 11A:
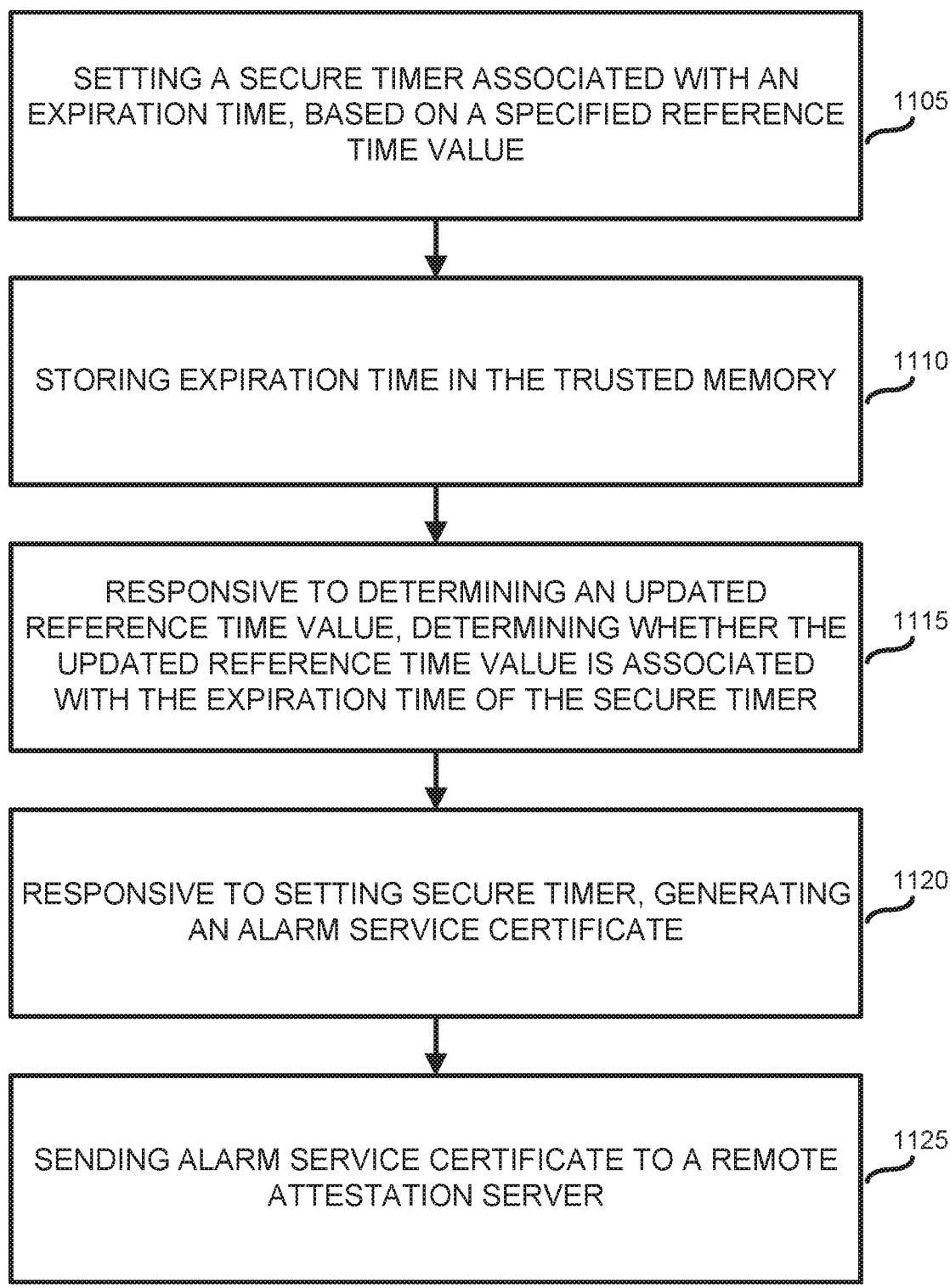

FIGS. 11A and 11B illustrate operations of methods for providing anti-rollback and related functionalities according to some embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, an electronic device. The operations described with reference to FIGS. 11A and 11B can, in some embodiments, be performed in addition to other operations of methods of implementing anti-rollback according to this disclosure (for example, method 1000 in FIG. 10). In some embodiments, the operations described with reference to FIGS. 11A and 11B can be performed in lieu of, or as part of operations of, other methods for implementing anti-rollback according to embodiments of this disclosure.

Referring to the non-limiting example of FIG. 11A, at operation 1105, the timer application sets a secure timer associated with an expiration time, based on a specified reference time value. According to certain embodiments, the timer is set through a secure timer service running on the device (for example, secure timer service 215 in FIG. 2, or secure timer service 330 in FIG. 3). In some embodiments, the secure timer is associated with an alarm to occur at the expiration time (for example, alarm 970 in FIG. 9).

In some embodiments, at operation 1110 the secure timer application stores the expiration time based on a specified reference time value in the trusted memory of the device (for example, trusted memory 245 in FIG. 2, the RPMB shown in FIG. 9, or an eSE).

According to various embodiments of this disclosure, the secure timer application periodically determines an updated reference time (for example, by determining an initial reference time, and then determining an updated reference time based in part on the initial reference time, or by incrementing a previously determined reference time in response to tick interval information provided to the trusted memory). At operation 1115, responsive to determining an updated reference time value, the secure timer application periodically determines whether the updated reference time value is associated with the expiration time of the secure timer. In some embodiments, the secure timer application performs operation 1115 at random intervals. In various embodiments, the secure timer application performs operation 1115 at predetermined intervals, or in response to predefined triggering events (for example, powering down the device).

In certain embodiments according to this disclosure, at operation 1120, responsive to setting the secure timer, the secure timer application generates an alarm service certificate. According to various embodiments, the alarm service certificate is encrypted with a public key of the device to provide trustworthy indicia of its authenticity and improved security.

In at least one embodiment according to this disclosure, the alarm service certificate is sent by a secure timer service to a remote attestation server (for example, remote attestation server 230 in FIG. 2). According to certain embodiments, the alarm service certificate can be used by the remote attestation server in verifying a subsequently received timer expiration certificate.

Referring to the non-limiting example of FIG. 11B, the reference time has reached the expiration time for a previously set timer (for example, the timer set in operation 1105), and responsive to determining that the updated reference time value is associated with the expiration time of the secure timer, the secure timer application generates a timer expiration certificate. According to various embodiments, the timer expiration certificate may be generated as an attestation blob.

According to various embodiments, at operation 1135, the device (or a secure timer service running on the device) sends the timer expiration certificate to a remote attestation server (for example, remote attestation server 230 in FIG. 2. At operation 1140, the secure timer application receives, via the secure timer service, an attestation result certificate from the remote server and validates the received certificate. Through the use and exchange of certificates attesting to the expiration of the timer at the device and separately confirming the result of attestation, RTC-time denominated services provided at the device are not susceptible to replay-type attacks or malicious use of false expiration certificates.

As shown in the illustrative example of FIG. 11B, at operation 1145, responsive to validating the attestation result certificate, the secure timer service terminates an RTC-time denominated service provided at the device.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for providing an anti-rollback secure timer service, the method comprising:
   determining, at a device comprising a processor providing a normal execution environment and a trusted execution environment (TEE), a trusted memory, and a real time clock (RTC) accessible through an operating system of the device, an initial reference time value, by a secure timer application running in the TEE, the initial reference time value determined based on an initial value of the RTC and a time delta value;
   receiving, via the normal execution environment, an input rolling back the RTC to a second value;
   determining an updated reference time value as a function of the initial reference time value, the second value of the RTC, and a previously stored old reference time value, wherein the function specifies the updated reference time value as a maximum of:
      the initial reference time value, or
      the previously stored old reference time value plus a measured time interval between a time of starting the device on and a time of determining the initial reference time value;
   determining an updated time delta value based on the second value of the RTC and the updated reference time value; and
   storing the updated time delta value and the updated reference time value in the trusted memory,
   wherein the initial value of the RTC comprises a value obtained by an initial service minus a measured interval between starting the device and the initial service obtaining the value.

2. The method of claim 1, further comprising:
   setting by the secure timer application, a secure timer associated with an expiration time, the expiration time based on a specified reference time value;
   storing the expiration time in the trusted memory; and
   responsive to determining the updated reference time value, determining whether the updated reference time value is associated with the expiration time of the secure timer.

3. The method of claim 2, further comprising:
   responsive to setting the secure timer, generating an alarm service certificate;
   sending the alarm service certificate, via a network, to a remote attestation server;
   responsive to determining that the updated reference time value is associated with the expiration time of the secure timer, generating, by the secure timer application, a timer expiration certificate; and
   sending the timer expiration certificate to the remote attestation server.

4. The method of claim 3, further comprising:
   receiving from the remote attestation server, an attestation result certificate, the attestation result certificate indicating that the timer expiration certificate is valid;
   validating, by the secure timer application, the attestation result certificate; and
   responsive to validating the attestation result certificate, terminating a service provided at the device.

5. The method of claim 1, wherein the initial reference time value comprises the time delta value plus a maximum of:
   the initial RTC time value plus a measured time interval between a time of powering the device on and the time of determining the initial reference time value; or
   a current RTC time value at the time of determining the initial reference time value.

6. The method of claim 1, wherein the trusted memory comprises a replay protected memory block (RPMB).

7. An apparatus comprising:
   a processor configured to provide a trusted execution environment (TEE) and a normal execution environment;
   a real-time clock (RTC) accessible through an operating system of the apparatus; and
   a memory comprising a trusted memory and instructions, wherein the processor is configured to:
      determine, by a secure timer application running in the TEE,
      an initial reference time value, the initial reference time value determined based on an initial value of the RTC of the apparatus and a time delta value, receive, via the normal execution environment, an input rolling back the RTC to a second value,
      determine an updated reference time value as a function of the initial reference time value, the second value of the RTC, and a previously stored old reference time value, wherein the function specifies the updated reference time value as a maximum of:
         the initial reference time value, or
         the previously stored old reference time value plus a measured interval between a time of starting the apparatus and a time of determining the initial reference time value,
      determine an updated time delta value based on the second value of the RTC and the updated reference time value, and
      store the updated time delta value and the updated reference time value in the trusted memory,
      wherein the initial value of the RTC comprises a value obtained by an initial service minus the measured interval between starting the apparatus and the initial service obtaining the value.

8. The apparatus of claim 7, wherein the memory further contains instructions, which, when executed by the processor, cause the apparatus to:
   set, by the secure timer application, a secure timer associated with an expiration time, the expiration time based on a specified reference time value,
   store the expiration time in the trusted memory, and
   responsive to determining the updated reference time value, determine whether the updated reference time value is associated with expiration of the secure timer.

9. The apparatus of claim 8, wherein the memory further contains instructions, which, when executed by the processor, cause the apparatus to:
responsive to setting the secure timer, generate an alarm service certificate,
send the alarm service certificate, via a network, to a remote attestation server,
responsive to determining that the updated reference time value is associated with the expiration time of the secure timer, generate, by the secure timer application, a timer expiration certificate, and
send the timer expiration certificate to the remote attestation server.

10. The apparatus of claim 9, wherein the memory further contains instructions, which, when executed by the processor, cause the apparatus to:
receive, from the remote attestation server, an attestation result certificate, the attestation result certificate indicating that the timer expiration certificate is valid,
validate, by the secure timer application, the attestation result certificate, and
responsive to validating the attestation result certificate, terminate a service provided at the apparatus.

11. The apparatus of claim 7, wherein the initial reference time value comprises the time delta value plus a maximum of:
the initial value of the RTC plus a measured time interval between the time of powering the apparatus on and the time of determining the initial reference time value; or
a current RTC time value at the time of determining the initial reference time value.

12. The apparatus of claim 7, wherein the trusted memory comprises a replay protected memory block (RPMB).

13. A non-transitory computer-readable medium comprising program code, which when executed by a device, causes the device to:
determine, at the device, the device comprising a processor providing a trusted execution environment (TEE) and a normal execution environment, a trusted memory, and a real time clock (RTC) accessible through an operating system of the device, an initial reference time value, by a secure timer application running in the TEE, the initial reference time value determined based on an initial value of the RTC, and a time delta value,
receive, via the normal execution environment, an input rolling back the RTC to a second value,
determine an updated reference time value as a function of the initial reference time value, the second value of the RTC, and a previously stored old reference time value, wherein the function specifies the updated reference time value as a maximum of:
the initial reference time value, or
the previously stored old reference time value plus a measured time interval between starting the device and determining the initial reference time value,
determine an updated time delta value based on the second value of the RTC and the updated reference time value, and
store the updated time delta value and the updated reference time value in the trusted memory,
wherein the initial value of the RTC comprises a value obtained by an initial service minus a measured interval between starting the device and the initial service obtaining the value.

14. The non-transitory computer-readable medium of claim 13, further comprising program code, which, when executed by the processor, causes the device to:
set, by the secure timer application, a secure timer associated with an expiration time, the expiration time based on a specified reference time value,
store the expiration time in the trusted memory, and
responsive to determining the updated reference time value, determine whether the updated reference time value is associated with the expiration time of the secure timer.

15. The non-transitory computer-readable medium of claim 14, further comprising program code, which when executed by the processor, causes the device to:
responsive to setting the secure timer, generate an alarm service certificate,
send the alarm service certificate, via a network, to a remote attestation server,
responsive to determining that the updated reference time value is associated with the expiration time of the secure timer, generate, by the secure timer application, a timer expiration certificate, and
send the timer expiration certificate to the remote attestation server.

16. The non-transitory computer-readable medium of claim 15, further comprising program code, which, when executed by the processor, causes the device to:
receive from the remote attestation server, an attestation result certificate, the attestation result certificate indicating that the timer expiration certificate is valid,
validate, by the secure timer application, the attestation result certificate, and
responsive to validating the attestation result certificate, terminate a service provided at the device.

17. The non-transitory computer-readable medium of claim 13, wherein the initial reference time value comprises the time delta value plus a maximum of:
the initial RTC time value plus a measured time interval between a time of powering the device on and a time of determining the initial reference time value; or
a current RTC time value at the time of determining the initial reference time value.

* * * * *